Jan. 5, 1971 T. P. YASIN 3,552,763
INTERCONNECTED VEHICLE SUSPENSION WITH PITCH
DISPLACEMENT AND LEVEL CONTROL SYSTEM
Filed Aug. 22, 1968 3 Sheets-Sheet 1

INVENTOR.
Thomas P. Yasin
BY
W. F. Wagner
ATTORNEY

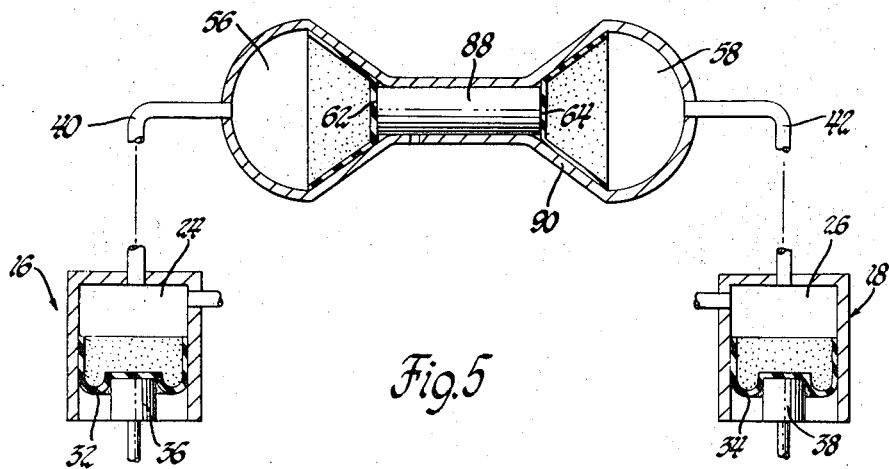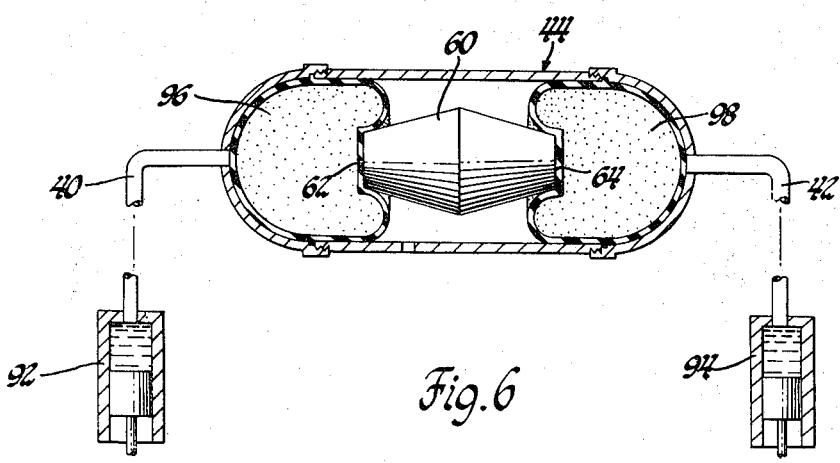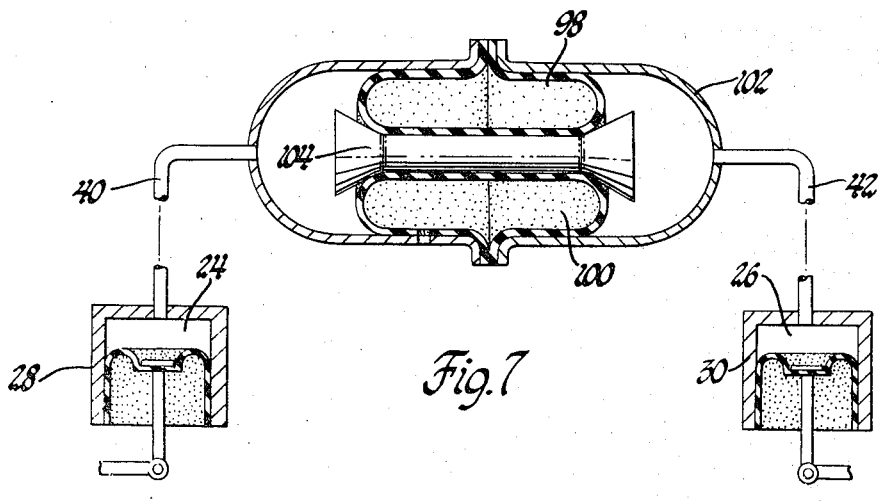

United States Patent Office

3,552,763
Patented Jan. 5, 1971

3,552,763
INTERCONNECTED VEHICLE SUSPENSION WITH PITCH DISPLACEMENT AND LEVEL CONTROL SYSTEM
Thomas P. Yasin, Birmingham, Mich., assignor to General Motors Corporation, Detroit, Mich., a corporation of Delaware
Filed Aug. 22, 1968, Ser. No. 754,680
Int. Cl. B60g *19/04*
U.S. Cl. 280—104      4 Claims

ABSTRACT OF THE DISCLOSURE

In a preferred embodiment, a motor vehicle sprung mass is elastically supported relative to front and rear wheels by longitudinally spaced fluid springs arranged in communication with opposite ends of a transducer assembly which automatically responds to changes in the ratios of pressures of the respective springs induced by pitch displacement of the sprung mass. The transducer is formed and arranged so as to automatically establish an increasing effective area acting on the fluid within the spring exhibiting a diminishing pressure and a decreasing effective area acting on the spring exhibiting an increasing pressure thereby acting to restore pitch equilibrium to the sprung mass for each change in load distribution thereon. Individual height sensing leveling valves associated with each spring function independently to vary the volume of fluid in each spring and enable restoration of the sprung mass to a level attitude.

---

This invention relates to fluid control devices and more particularly, although not exclusively, to a vehicle suspension system incorporating a ratio reversing transducer assembly interposed between a pair of longitudinally interconnected fluid springs operative to automatically restore pitch equilibrium to the vehicle sprung mass irrespective of changes in load distribution thereon.

As amply indicated by a profusion of prior art patents, longitudinally interconnected "compensating" suspension systems have long been the subject of intense interest. Typically illustrative of such systems is the arrangement wherein the sprung mass is elastically supported relative to the vehicle running gear by a pair of longitudinally spaced pneumatic springs connected together by a common conduit. Arrangements of this type have the known advantage of providing very low spring rates with respect to forces acting on individual wheels and thereby producing very soft ride, as well as the additional advantage of distributing single wheel impact reaction forces equally between the front and rear of the chassis. While systems of this type theoretically possess these desirable characteristics, it is equally well known that in virtually all known types the sprung mass exhibits essentially zero pitch stability. That is, in the event that a vertical force is applied to the sprung mass either forwardly or rearwardly of the center of gravity thereof, no restoring force exists to prevent rotation of the spung mass about its effective transverse axis. Consequently, in the prior art, practical realization of the theoretical benefits has usually been dependent upon the introduction into the vehicle suspension system of a secondary elastic system operating solely to establish a workable level of pitch stability for the sprung mass. While many such compound systems are known and have achieved some measure of success, to the extent that the secondary elastic system achieves the desired result, a proportional reduction in the theoretical benefits of the interconnected suspension system necessarily result.

More recently, it has been proposed to overcome the pitch instability problem by utilizing a piston, cylinder and diaphragm pneumatic spring system of the type described in which one of the springs is fashioned to provide a progressively changing effective area whereby the descent of the sprung mass at the end adjacent the one spring occasions displacement of the piston to a level in the cylinder providing an effective cross section sufficiently large to support the added weight on such spring resulting from change in load distribution. However, because the added weight also increases the fluid pressure in such spring and such pressure is equally increased in the other spring upon which a lesser load is imposed, the sprung mass achieves equilibrium in an unlevel attitude.

An object of the present invention is to provide an interconnected suspension in which establishment and maintenance of a practical level of pitch stability is accomplished without resort to secondary elastic systems which inherently override the functional characteristics of the primary interconnected suspension.

Another object is to provide an arrangement of the stated character in which the pitch stabilizing means is further functional to automatically reestablish pitch equilibrium when the sprung mass is subjected to static load distribution changes such as the addition of passengers, cargo, etc.

A still further object of the invention is to provide a system of the stated character including means for automatically restoring the sprung mass to a level attitude after or concurrently with reestablishment of pitch equilibrium.

The foregoing and other objects, advantages and features of the invention will become more readily apparent as reference is had to the accompanying specification and drawings wherein:

FIG. 5 is a view illustrating a further modification of the invention;

FIG. 6 is a view illustrating another modification of the invention; and

FIG. 7 is a view illustrating a still further modification of the invention.

Figure 1:
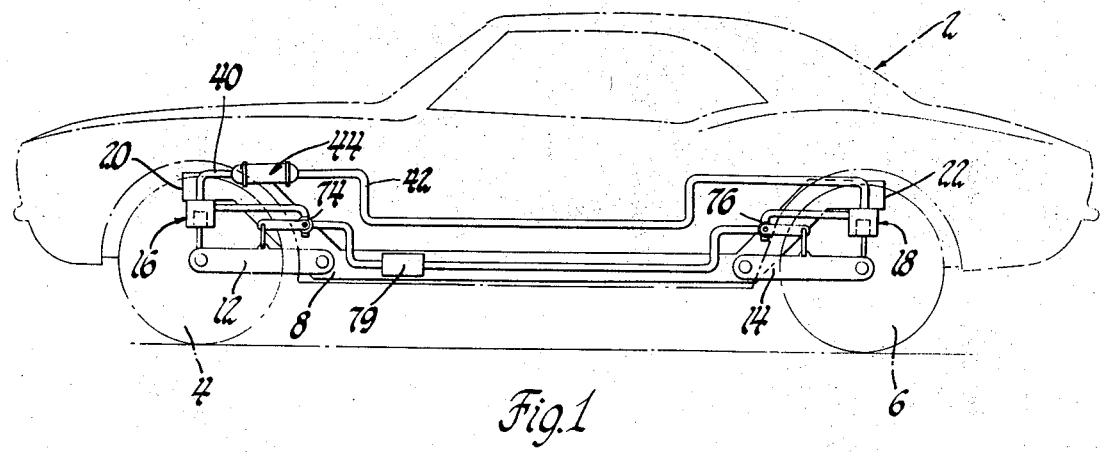
FIG. 1 is a schematic view of a vehicle incorporating a suspension system in accordance with the invention.
Figure 2:
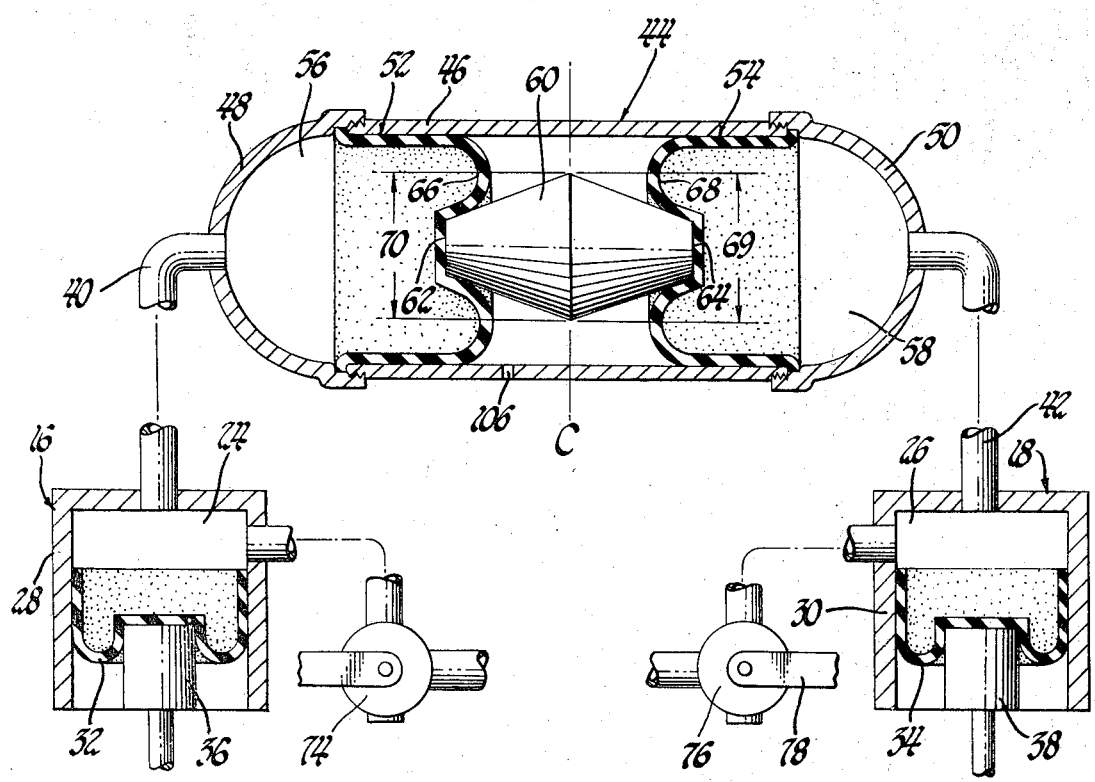
FIG. 2 is an enlarged side elevational view, partly in section, of the system illustrated in FIG. 1, the components being shown in the relative positions occupied when the vehicle is in static equilibrium and with a normal load distribution.

Referring now to the drawings and particularly FIGS. 1 and 2, there is shown a motor vehicle 2 in which the front and rear wheels 4 and 6 are connected to the vehicle frame 8 by leading and trailing links 12 and 14, respectively. To elastically support the vehicle frame 8 relative to wheels 4 and 6, pneumatic spring assemblies 16 and 18 are disposed respectively between the forward and rearward ends 20 and 22 of the frame and the vertically adjacent ends of the links 12 and 14. As shown in FIG. 2, springs 16 and 18 are of conventional piston, cylinder and rolling lobe diaphragm type wherein air under pressure is contained within the chambers 24 and 26 defined by the cylinders 28 and 30 and associated diaphragms 32 and 34. Consequently, when the pressure within chambers 24 and 26 is sufficiently high so that when acted upon by the effective areas of the pistons 36 and 38, the adjacent ends of the vehicle are elastically supported at the predetermined desired level above the ground.

In accordance with one feature of the invention, springs 16 and 18 are longitudinally interconnected by conduit means 40 and 42 which have interposed therebetween a transducer assembly 44. As seen best in FIG. 2, transducer assembly 44 comprises a cylindrical element 46 having opposite domelike end portions 48 and 50 which cooperate with opposed rolling lobe diaphragms 52 and 54 disposed within element 46 to form closed variable volume chambers 56 and 58 directly communicating respectively with chambers 24 and 26 of springs 16 and 18. Also disposed within cylindrical element 46 is a double ended floating piston 60 having symmetrically profiled or contoured opposite ends 62 and 64 operatively engaging the respective annular convolutions 66 and 68 of rolling lobe diaphragms 52 and 54. When constructed and arranged in the manner thus far described, it will be evident that a system in accordance with the invention exhibits the ability of conventional interconnected suspensions in terms of transient impact on a single wheel of a vehicle. That is to say, when the wheel 4 encounters an obstruction, upward deflection thereof results in compression of the pneumatic medium within chambers 24, 56 resulting in a force acting on the end 62 of piston 60 urging it in a rearward direction, in turn resulting in an approximately corresponding increase in pressure in chambers 58, 26 so that the force of single wheel impact is distributed essentially equally between the front and rear of the vehicle. Naturally, as soon as the exciting obstacle has been traversed, the wheel 4 descends to normal ground level reducing the pressure in chambers 24, 56 whereupon the higher induced pressure in chambers 26, 58 act to restore the piston 60 to a centered position reestablishing the initial pressure balance between the front and rear suspension springs.

According to the principal feature of the invention, unlike prior art interconnected suspensions, a system according to the present invention achieves static pitch equilibrium of the sprung mass of the vehicle as an incidence of function of the transducer assembly. To this end, as previously mentioned, the piston 60 is provided with tapered opposed ends which in the following described manner enable establishment and maintenance of progressively changing pressure ratios within the chambers 24, 56 and 26, 58, respectively, necessary in order to reestablish pitch equilibrium of the sprung mass following changes in longitudinal load distribution. By way of ilustration, assume that the vehicle shown in FIG. 1 is subjected to a change in load distribution by the addition of cargo at the rear. In such circumstance, the additional weight imposed over the rear wheels result in the sprung mass descending relative to the wheels with attendant relative displacement of piston 38 in cylinder 30. The rise of pressure in chamber 26 accompanying such displacement causes a similar rise in pressure in chamber 58. Concurrently, the rise in pressure in chamber 58 urges the central portion of diaphragm 68 toward the left resulting in simultaneous displacement of the piston 60 to the left from the centered position C and reduction in the effective cross section 69 of the end 64 reacting against the diaphragm (compare FIGS. 2 and 3). Concurrent with displacement of piston 60 toward the left, the end 62 acts against the central portion of diaphragm 66 causing an increase in the effective cross section 70 sufficient to reestablish a unity ratio between the pressure in chambers 24, 56 times the effective cross section 70 and the pressure in chamber 26, 58 times the effective cross section 69. As soon as this condition is achieved, piston 60 is maintained in balance between the opposite springs while the differential pressures therein act to support the change in load distribution.

Figure 3:
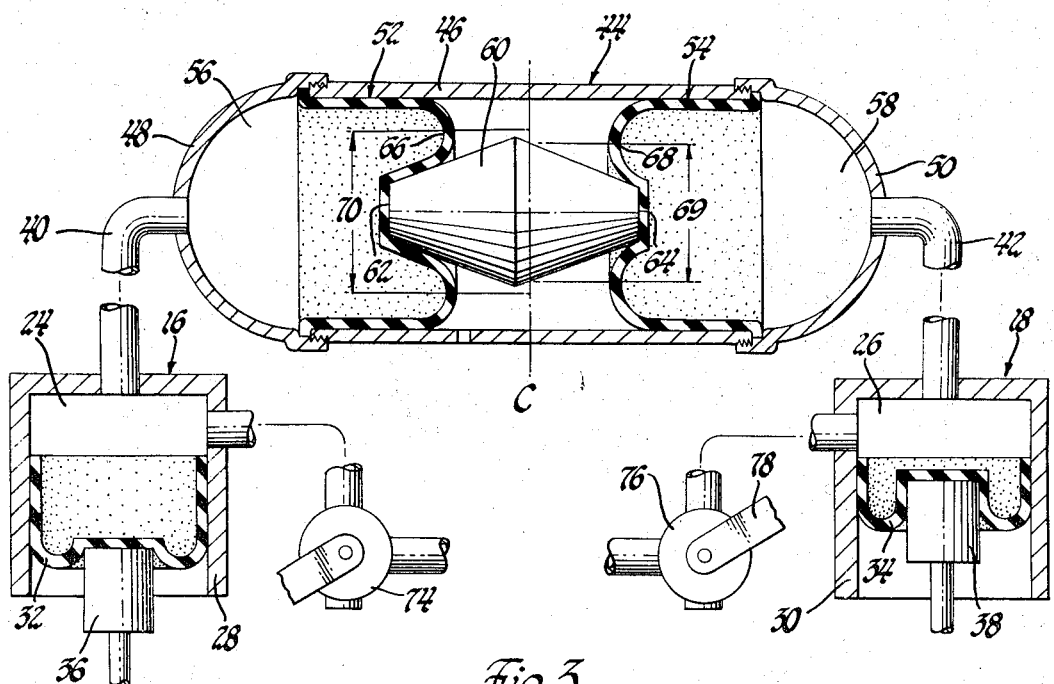
FIG. 3 is a view similar to FIG. 2 illustrating the relationship of the components when the vehicle sprung mass is subjected to a change in static load distribution.

While, as will be evident from FIG. 3, the reestablishment of pitch equilibrium accomplished by the transducer assembly results in a change in pitch attitude for the sprung mass; i.e., departure from level, according to a further feature of the invention, the vehicle sprung mass is readily restored to a level attitude by the provision of separate leveling valve assemblies 74 and 76, of conventional construction, interposed between the vehicle superstructure and the adjacent links 12 and 14. Valves 74 and 76 operate in the usual manner to mechanically sense changes in height between the sprung and unsprung mass and operate automatically to introduce or exhaust air from the springs with which they are associated until the predetermined design height at each end has been restored. Thus, in the case of the condition illustrated in FIG. 3, during achievement of pitch equilibrium via the function of the transducer assembly 44, the control link 78 of valve 76 has moved to the position shown and opens to admit air from the accumulator or storage tank 79 to the interior of spring 18 until the vertical displacement between cylinder 30 and piston 38 is restored to that shown in FIG. 2 at which time the valve 76 will have returned to the closed or neutral position. Similarly, valve 74 acts to exhaust air from spring 16 until the initial vertical displacement between cylinder 28 and piston 36 is restored. In this connection, it is to be particularly noted that addition of air to spring 18 or removal from spring 16 in no wise disturbs the newly established pressures in chambers 26, 58 and 24, 56 but merely increases or decreases the volume of air at the corresponding pressure. Although the function of leveling valve 74 and 76 has been described in the sense of a secondary or sequential function, it will, of course, be apparent that in practical operation the leveling function of the valves and equilibrium restoring function of the transducer assembly 44 may occur simultaneously. However, it is customary and desirable that the leveling valves 74 and 76 incorporate so-called delay mechanisms which disable instantaneous operation thereof in order to reduce wasteful air consumption which would otherwise result due to transient wheel excursion such as are encountered on rough or undulating roads. Hence, while the two functions, for practical purposes, may in fact occur in sequence, the need arises solely for a purpose not related to the operation of the invention.

Figure 4:
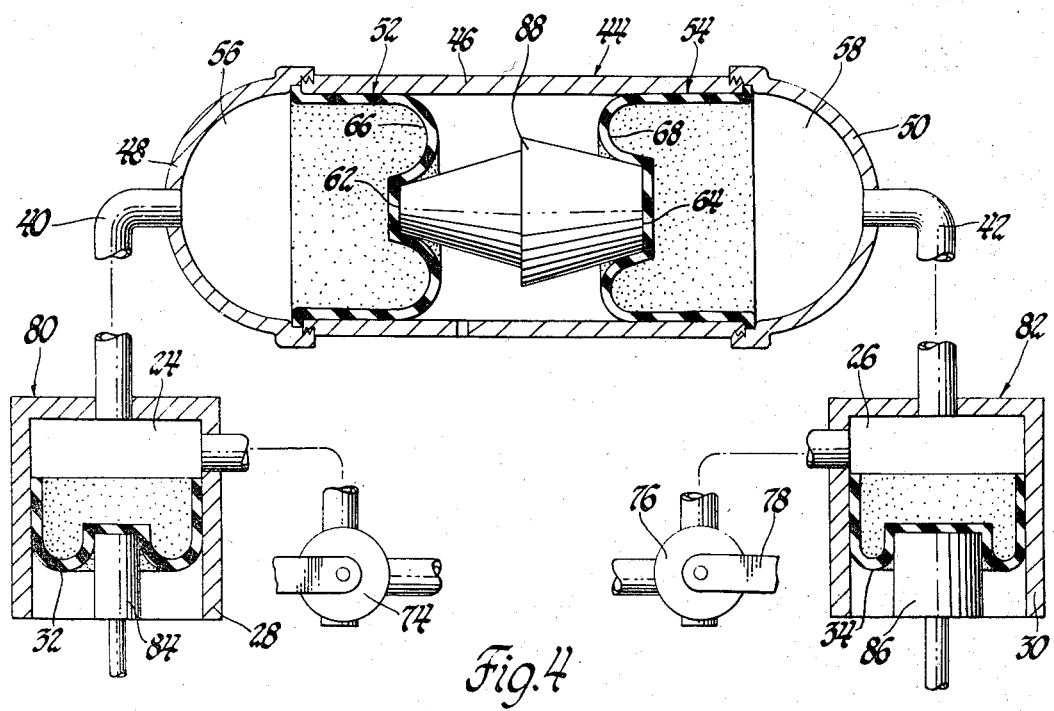
FIG. 4 is a view similar to FIG. 2 illustrating a modified form of the invention.

In FIG. 4 there is shown a modification of the invention which is similar in all respects to the embodiment shown in FIG. 2 except for the provision of front and rear springs 80 and 82 in which the cross sectional area of the front piston 84 is approximately one-half the cross-sectional area of the rear piston 86. In this arrangement, the floating piston 88 is then symmetrically contoured at its opposite ends but with dimensional ratios proportioned to the ratio of pistons 84 and 86.

FIG. 5 illustrates a modification in which the piston 88 is cylindrical in form while the wall of the cylinder 90 is oppositely tapered.

FIG. 6 illustrates adaptation of the invention to a hydropneumatic suspension in which case the primary suspension springs are replaced by telescoping members 92 and 94 providing an interior which is filled with an incompressible fluid. The diaphragms in turn are replaced by sealed bladders 96 and 98 containing air or a neutral gas under pressure.

FIG. 7 illustrates a further embodiment of the invention enabling utilization of a subatmospheric elastic medium. In this case, the rolling lobe diaphragms 98 and 100 are disposed in cylinder 102 in reverse relationship while the floating piston 104 is formed with opposite ends having confronting tapers.

In all of the illustrated forms of the transducer assembly, the portion of the cylinder surrounding the piston is vented to atmosphere as by port 106 in FIG. 2.

While several embodiments of the invention have been shown and described, it will be apparent that other changes and modifications may be made therein. It is, therefore, to be understood that it is not intended to limit the invention to the embodiments shown.

I claim:

1. In a fluid pressure system having first and second variable displacement fluid motors, conduit means communicating with each of said motors, a transducer assembly interconnecting said conduits, said assembly comprising a container element having closed cavities at each end thereof defined in part by opposed rolling lobe diaphragms operatively engaging a central floating piston element, at least one of said elements being contoured in cross section so that linear displacement of said piston in either direction from a centered position increases the effective area of the end of said piston projecting in the direction opposite said linear displacement while decreasing the effective area of the other end thereof.

2. The invention of claim 1 wherein the contour of said one element is such that displacement of the piston maintains a unity ratio between $P_1 \times D_1$ and $P_2 \times D_2$ where $P_1$ equals pressure in the first fluid motor,
$P_2$ equals pressure in the second fluid motor,
$D_1$ equals the effective area of the piston end adjacent $P_1$, and
$D_2$ equals the effective area of the piston end adjacent $P_2$.

3. The invention of claim 2 wherein said piston is symmetrically contoured in cross section at its opposite ends and said container is cylindrical in cross-section.

4. The invention of claim 2 wherein the fluid motors are formed and arranged to establish a normal pressure differential and the contours at the opposite ends of said pistons are symmetrical while the cross-sectional dimensions are proportonal to the pressure differential between the first and second fluid motors.

References Cited
UNITED STATES PATENTS

| | | | |
|---|---|---|---|
| 3,050,316 | 8/1962 | Behles | 280—104 |
| 3,007,712 | 11/1961 | Moulton | 280—104 |
| 2,003,511 | 6/1935 | Mercier | 280—104X |

PHILIP GOODMAN, Primary Examiner